(12) United States Patent
Dooley

(10) Patent No.: US 11,885,583 B2
(45) Date of Patent: Jan. 30, 2024

(54) SHOULDER SHOT TREE TOPPLER

(71) Applicant: DTX Tooling, LLC, Austin, TX (US)

(72) Inventor: Malcolm Stuart Dooley, Austin, TX (US)

(73) Assignee: DTX Tooling, LLC, Austin, TX (US)

( * ) Notice: Subject to any disclaimer, the term of this patent is extended or adjusted under 35 U.S.C. 154(b) by 0 days.

(21) Appl. No.: 17/070,731

(22) Filed: Oct. 14, 2020

(65) Prior Publication Data

US 2021/0108880 A1    Apr. 15, 2021

Related U.S. Application Data

(60) Provisional application No. 62/914,715, filed on Oct. 14, 2019.

(51) Int. Cl.
| | |
|---|---|
| *F41B 11/62* | (2013.01) |
| *F41B 11/80* | (2013.01) |
| *F41B 11/83* | (2013.01) |
| *A01K 89/017* | (2006.01) |

(52) U.S. Cl.
CPC ............ *F41B 11/62* (2013.01); *A01K 89/017* (2013.01); *F41B 11/80* (2013.01); *F41B 11/83* (2013.01)

(58) Field of Classification Search
CPC ........... F41B 11/62; F41B 11/80; F41B 11/83; F41B 11/71
See application file for complete search history.

(56) References Cited

U.S. PATENT DOCUMENTS

| | | | | |
|---|---|---|---|---|
| 2,069,276 | A |   | 2/1937 | Ryan |
| 2,090,731 | A | * | 8/1937 | Klein ...................... F41B 11/68 43/6 |
| 2,504,525 | A |   | 4/1950 | Holderness |
| 2,581,758 | A | * | 1/1952 | Galliano ................. F41B 11/00 124/75 |
| 3,056,395 | A | * | 10/1962 | Merz ...................... F41B 11/62 124/31 |
| 3,780,720 | A | * | 12/1973 | Alderson .............. F41B 11/723 124/31 |
| 4,644,930 | A | * | 2/1987 | Mainhardt ............. F41B 11/62 42/1.06 |
| 4,848,307 | A |   | 7/1989 | Tsao et al. |
| 5,343,850 | A |   | 9/1994 | Steer |
| 5,373,833 | A |   | 12/1994 | D'Andrade |
| 5,546,863 | A |   | 8/1996 | Joslyn |
| 5,660,160 | A | * | 8/1997 | Prescott, Jr. ............ F41B 11/68 124/75 |
| 5,887,577 | A |   | 3/1999 | Sherrill |
| 6,244,261 | B1 | * | 6/2001 | West, Jr. ................. F41B 11/62 102/504 |

(Continued)

FOREIGN PATENT DOCUMENTS

KR    101557005 B1 * 10/2015

*Primary Examiner* — Christopher R Harmon
(74) *Attorney, Agent, or Firm* — Outlier Patent Attorneys, PLLC

(57) ABSTRACT

An apparatus may include a pressure vessel configured to contain a compressed gas; a barrel having an open end; a valve configured to release the compressed gas from the pressure vessel into the barrel to launch a projectile from the open end of the barrel; and a shoulder support configured to allow a user of the apparatus to actuate the valve while the apparatus is mounted on a shoulder of the user.

20 Claims, 4 Drawing Sheets

(56) References Cited

U.S. PATENT DOCUMENTS

| | | | |
|---|---|---|---|
| 6,276,353 B1* | 8/2001 | Briggs | F41B 11/57 |
| | | | 124/71 |
| 6,364,162 B1 | 4/2002 | Johnson et al. | |
| 6,997,770 B2 | 2/2006 | Lapointe | |
| 7,409,794 B2 | 8/2008 | Triano et al. | |
| 9,605,924 B1* | 3/2017 | McCaslin | F41A 3/72 |
| 2003/0069091 A1* | 4/2003 | Wengert | F41B 11/681 |
| | | | 124/69 |
| 2006/0254570 A1* | 11/2006 | Dillon | F41B 11/62 |
| | | | 124/69 |
| 2007/0214705 A1 | 9/2007 | Osenbauch et al. | |
| 2009/0178329 A1* | 7/2009 | Jelnicki, Jr. | F42B 12/68 |
| | | | 43/19 |
| 2014/0060509 A1* | 3/2014 | Tseng | F41A 9/67 |
| | | | 124/40 |
| 2014/0283809 A1* | 9/2014 | Huebl | F41B 11/60 |
| | | | 124/56 |
| 2015/0059726 A1* | 3/2015 | Harvey | F41B 11/62 |
| | | | 124/73 |
| 2015/0198407 A1* | 7/2015 | Giannelli | F41B 11/62 |
| | | | 124/76 |
| 2015/0316345 A1* | 11/2015 | Brahler, II | F41B 11/72 |
| | | | 124/73 |
| 2016/0146567 A1* | 5/2016 | Nachefski | F41B 11/62 |
| | | | 124/73 |
| 2018/0202753 A1* | 7/2018 | Willson | F41B 11/55 |

* cited by examiner

SHOULDER SHOT TREE TOPPLER

CROSS-REFERENCE TO RELATED APPLICATION

This application claims priority under 35 U.S.C. § 119(e) to U.S. Provisional Patent Application Ser. No. 62/914,715, filed Oct. 14, 2019, which is incorporated by reference herein in its entirety.

TECHNICAL FIELD

The present disclosure relates in general to propelling an object accurately over extended distances by using compressed air or gas.

BACKGROUND

The present disclosure improves upon other methods of projecting an object. In some embodiments, compressed air or gas may be used to propel a weighted or unweighted object, optionally including an attachment such as a rope or string, to reach an extended distance. Some embodiments may improve upon the efficacy, accuracy, and safety of existing methods by creating an object ejecting apparatus that will not wear down over time, that can be firmly mounted into the ground, and that has an enclosure for the object in an open-ended, hollow barrel that prevents the trajectory of the object from being adversely affected by human error.

Some embodiments of this disclosure may be particularly stable and safe when used to propel a weighted or unweighted object, optionally including an attachment, to reach an extended distance such as up and over power lines.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with projecting objects may be alleviated.

In accordance with embodiments of the present disclosure, an apparatus may include a pressure vessel configured to contain a compressed gas; a barrel having an open end; a valve configured to release the compressed gas from the pressure vessel into the barrel to launch a projectile from the open end of the barrel; and a shoulder support configured to allow a user of the apparatus to actuate the valve while the apparatus is mounted on a shoulder of the user.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
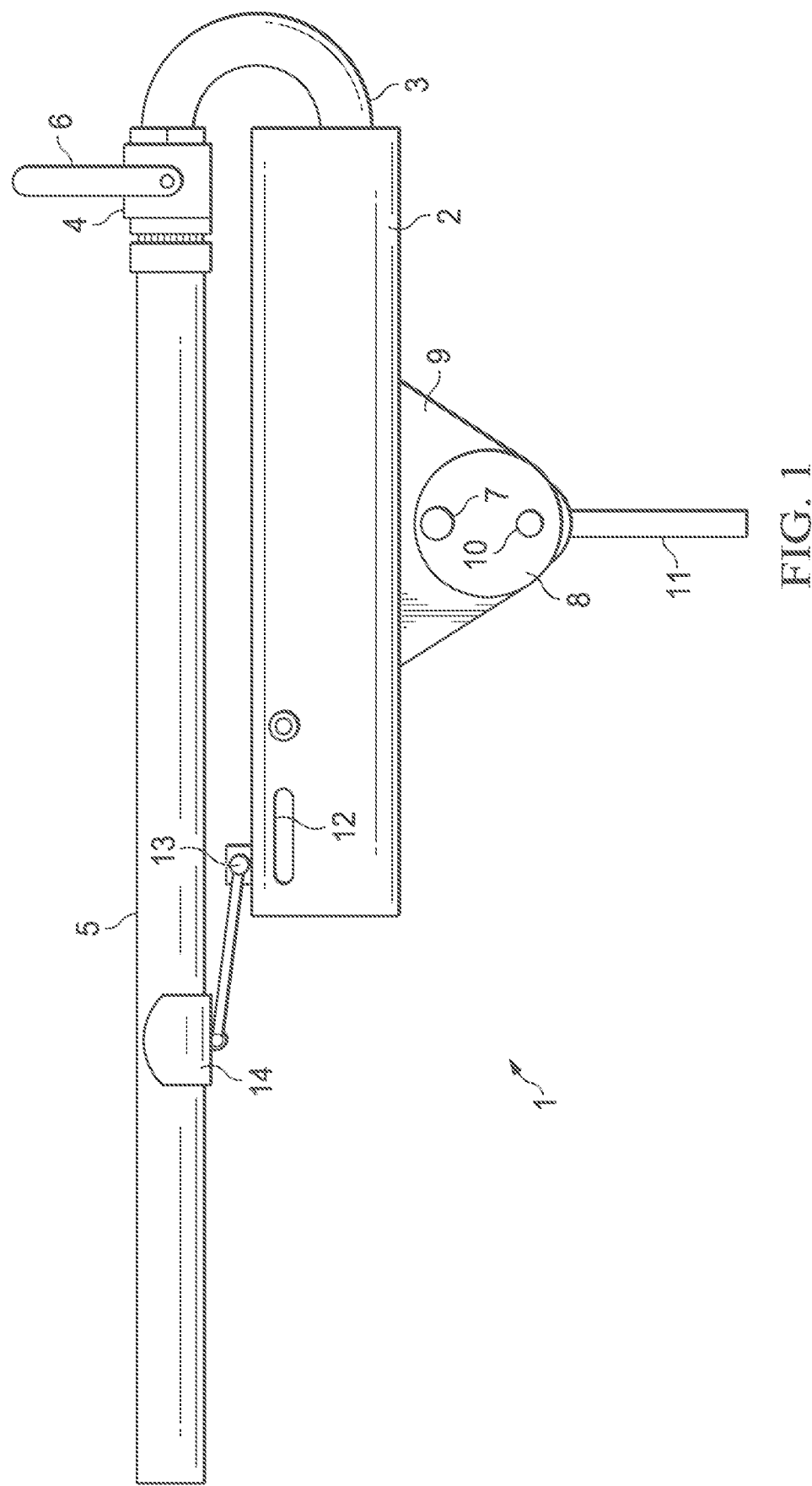
FIG. 1 illustrates a side view of an example apparatus, in accordance with embodiments of the present disclosure.

Preferred embodiments and their advantages are best understood by reference to FIGS. 1 through 5, wherein like numbers are used to indicate like and corresponding parts.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

According to some embodiments, an object may be stabilized and projected with compressed air or gas. The stability, accuracy, and efficacy of the ejection process is increased, and safety concerns of the ejection process are diminished. The use of other methods of propelling an object, such as springs, elastic bands, and explosives may result in decay over time, instability, and increased likelihood of accidental ejection.

Embodiments may include a particular machinery makeup that increases stability in the ejection process compared to the use of other methods. This disclosure may be especially effective in the utility sector to reach up and over power lines, facilitating maintenance.

One embodiment includes an ejector attachment device comprising: a cylindrical compressed gas or air pressured container; an equal, and open ended hollow pipe attached to the air or gas pressured container; a valve; an open ended hollow barrel; a mechanism to release the air or gas pressurized in the cylindrical air or gas pressured container; a weighted or unweighted object; and an attachment to the weighted or unweighted object.

In certain instances the compressed air or gas may be within a cylindrical container from 0 to 140 psi. In some embodiments, the cylindrical container may hold about 120 psi. Compressed gases may include air, carbon dioxide, nitrogen, argon, helium, or any other suitable gas.

In some embodiments, an apparatus may include one source of support; however, other numbers of support mechanisms, such as two, three, and four, have produced successful results in terms of attachment ejection efficacy, stability, and distance.

There is also disclosed a method for assembling an attachment ejector. The method includes forming a cylindrical compressed air or gas container; welding an equal, and open ended hollow pipe to the container; attaching a valve connecting the open ended hollow pipe to the open ended hollow barrel; attaching a mechanism to release the air or gas pressurized in the cylindrical compressed air or gas container (in one non-limiting aspect the mechanism may be a handle); providing a weighted or unweighted object; coupling an attachment to the weighted or unweighted object (in one non-limiting aspect the attachment may be a string). The weighted or unweighted object and attachment may be inserted into the open ended hollow barrel, and the compressed air or gas may be released to eject from the open ended hollow barrel the weighted or unweighted object and the attachment to reach an extended distance with the object, and retain control over the object via the attachment.

Turning now to FIG. 1 of the drawings, the attachment ejecting apparatus 1 is made up of a cylindrical compressed gas or air container 2, an open ended hollow pipe 3 attached to the container 2 and connecting container 2 to valve 4 (which may in some embodiments be a hollow pipe having an equal diameter at both ends), a valve 4, an open ended hollow barrel 5, a mechanism 6 to release the compressed air or gas in the container 1, and a pin 7 connecting two plates. The pin 7 may be used to adjust the relation of the two plates to each other to alter the trajectory of the weighted or unweighted object and attachment by changing the position of the attachment ejecting apparatus 1 with respect to the opposite outward facing plate 9 and the bar 11 by rotating them about the bolt 10 connecting the two plates. In one embodiment, the bar 11 attached to outward facing plate 8 can be used to attach means of support of the attachment ejecting apparatus 1. Attachment ejecting apparatus 1 may further include air gauge 12, a knob used to tighten adjustable brace 13 of open ended hollow barrel 5, and support 14 for the open ended hollow barrel 5.

Figure 2:
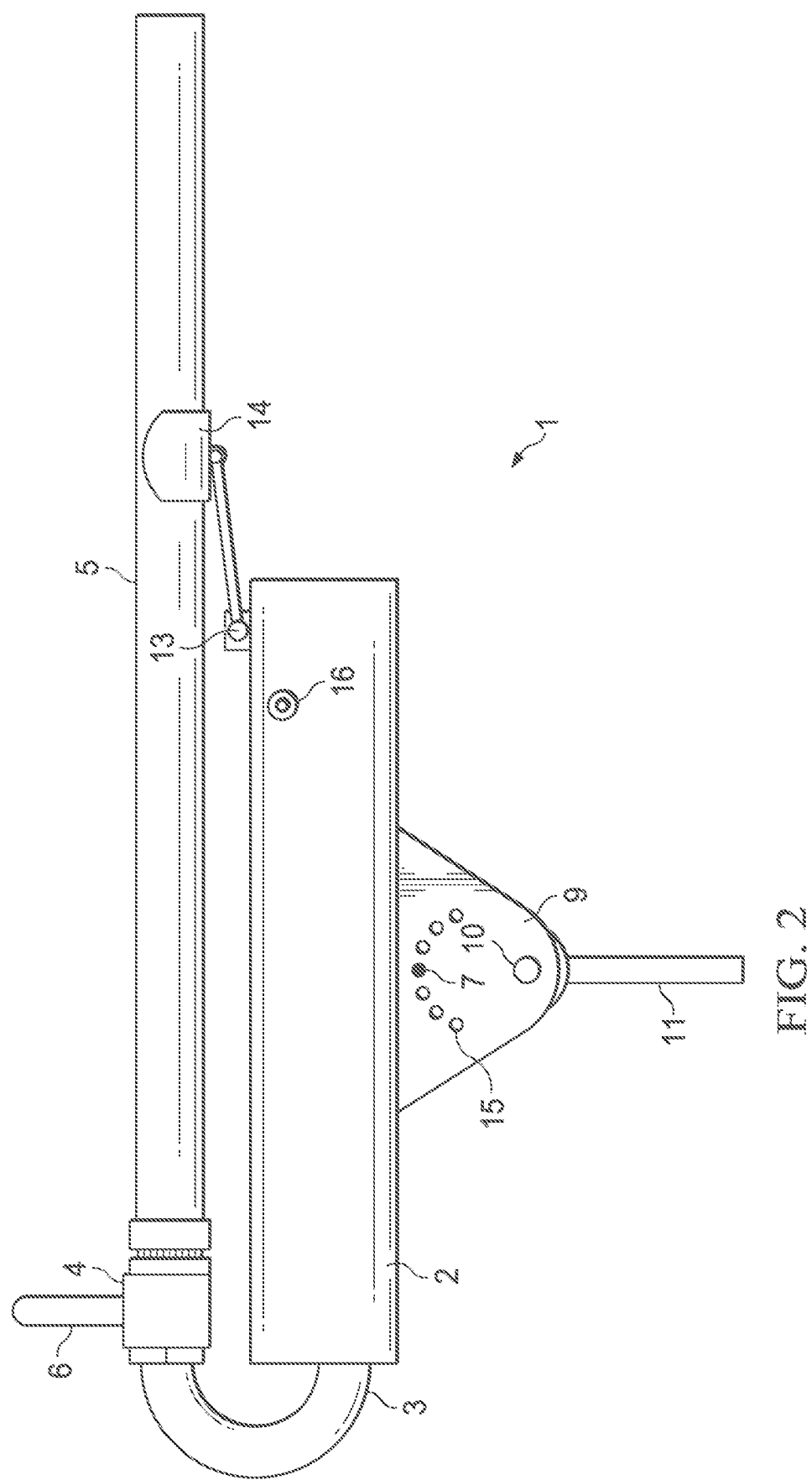
FIG. 2 illustrates another side view of the embodiment of FIG. 1, in accordance with embodiments of the present disclosure.

In FIG. 2 of the drawings, the attachment ejecting apparatus 1 is made up of a cylindrical compressed gas or air container 2, an equal, and open ended hollow pipe 3 attached to the container that connects container 2 and valve 4, a valve 4, an open ended hollow barrel 5, a mechanism 6 to release the compressed air or gas in the container 1, a pin 7 connecting two plates. Pin 7 may be used to adjust the relation of the two plates to each other to alter the trajectory of the weighted or unweighted object and attachment by changing the position of the attachment ejecting apparatus 1, the opposite outward facing plate 9 (from FIG. 1), the bolt 10 connecting the two plates, bar 11 attached to outward facing plate 8 (from FIG. 1), that in one non-limiting embodiment can be used to attach means of support of the attachment ejecting apparatus 1, knob 13 used to tighten adjustable open ended hollow barrel 5, support 14 for the open ended hollow barrel 5, holes to insert the pin 7 connecting two plates, to adjust the relation of the two plates to each other to alter the trajectory of the weighted or unweighted object and attachment by changing the position of the attachment ejecting apparatus 1, valve 16, used to fill up the cylindrical compressed gas or air container 2 with compressed gas or air.

Thus according to FIGS. 1 and 2, an attachment ejecting apparatus may comprise a cylindrical compressed gas or air container, an equal, and open ended hollow pipe attached to the container, a valve, an open ended hollow barrel, a mechanism to release the air pressurized in the container, a pin connecting two plates (to alter the trajectory of the weighted or unweighted object, and attachment), a weighted or unweighted object that may be inserted in operation, and an attachment to the weighted or unweighted object. The attachment ejecting apparatus may be used to reach extended distances with a weighted or unweighted object, and an attachment, such as up and over power lines to facilitate maintenance by personnel. The attachment ejecting apparatus is particularly stable, and safe in propelling a weighted or unweighted object, and attachment to reach an extended distance, and overcomes efficacy, accuracy, and safety issues associated with the propelling of an object extended distances.

The following is a numbered list of certain embodiments that may be used according to FIGS. 1 and 2. Although written in the style of claims, this is merely a list of example embodiments contemplated herein.

1. An attachment ejecting apparatus comprising:
    a cylindrical compressed gas or air container;
    an equal, and open ended hollow pipe attached to the container;
    a valve;
    an open ended hollow barrel;
    a mechanism to release the air or gas pressurized in the container;
    a pin connecting two plates;
    a weighted or unweighted object; and
    an attachment to the weighted or unweighted object.

2. The attachment ejecting apparatus in embodiment 1, wherein the apparatus is supported by at least one attachment.

3. The attachment in embodiment 2, wherein the attachment is removable.

4. The attachment in embodiment 2, wherein the attachment is permanently affixed.

5. The attachment ejecting apparatus in embodiment 1, wherein the open ended pipe communicates with the open ended barrel, and the cylindrical air or gas pressured container.

6. The attachment ejecting apparatus in embodiment 1, wherein the cylindrical air or gas pressured container is configured to hold up to 120 psi.

7. The attachment ejecting apparatus in embodiment 1, wherein the cylindrical air or gas pressured container is made of stainless steel.

8. The attachment ejecting apparatus in embodiment 1, wherein the open ended barrel is industrial grade polyvinyl chloride.

9. The attachment ejecting apparatus in embodiment 1, wherein the mechanism to release the air or gas pressurized in the cylindrical container is a handle.

10. The attachment ejecting apparatus in embodiment 1, wherein the mechanism to release the air or pressurized in the cylindrical container is a latch.

11. The attachment ejecting apparatus in embodiment 1, wherein the attachment has an apex narrower than the base.

12. The attachment ejecting apparatus in embodiment 1, wherein the weighted or unweighted object gradually increases in diameter from the apex until it reaches a diameter of 2 inches.

13. The attachment ejecting apparatus in embodiment 1, wherein the attachment is composed of aluminum.

14. The attachment ejecting apparatus in embodiment 1, wherein the pin connects two adjustable plates.

15. The attachment ejecting apparatus in embodiment 1, wherein the pin connects one fixed, and one adjustable plate.

16. The attachment ejecting apparatus in embodiment 1, wherein the attachment is weighted in the apex up until the attachment reaches a diameter of 2 inches.

17. A method for assembling an attachment ejector, the method including a cylindrical air or gas pressured container, an open ended hollow pipe attached to the cylindrical container, a valve, an open ended barrel, the valve connecting the open ended hollow pipe to the open ended barrel, and a mechanism to release the air or gas pressurized in the cylindrical container.

18. The method in embodiment 17, wherein the safety, and stability of ejecting an attachment is greater by using air or gas pressure than other processes.

19. The method in embodiment 17, wherein the safety, and stability of ejecting an attachment is greater using an open ended barrel to enclose the weighted or unweighted object prior to, and in the beginning of the ejection process to eliminate human error.

20. The method in embodiment 17, wherein the cylindrical air or gas pressured container contains up to 120 psi.

Figure 3:
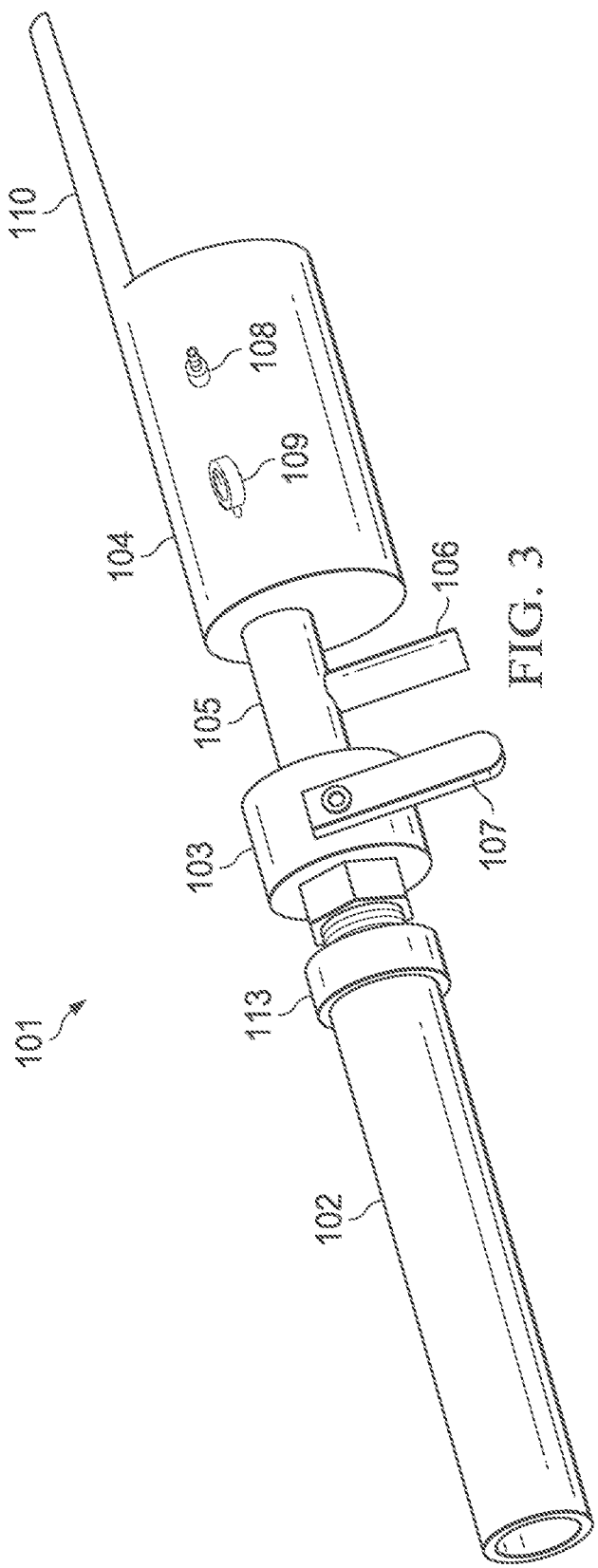
FIG. 3 illustrates a perspective view of another apparatus, in accordance with embodiments of the present disclosure.
Figure 4:
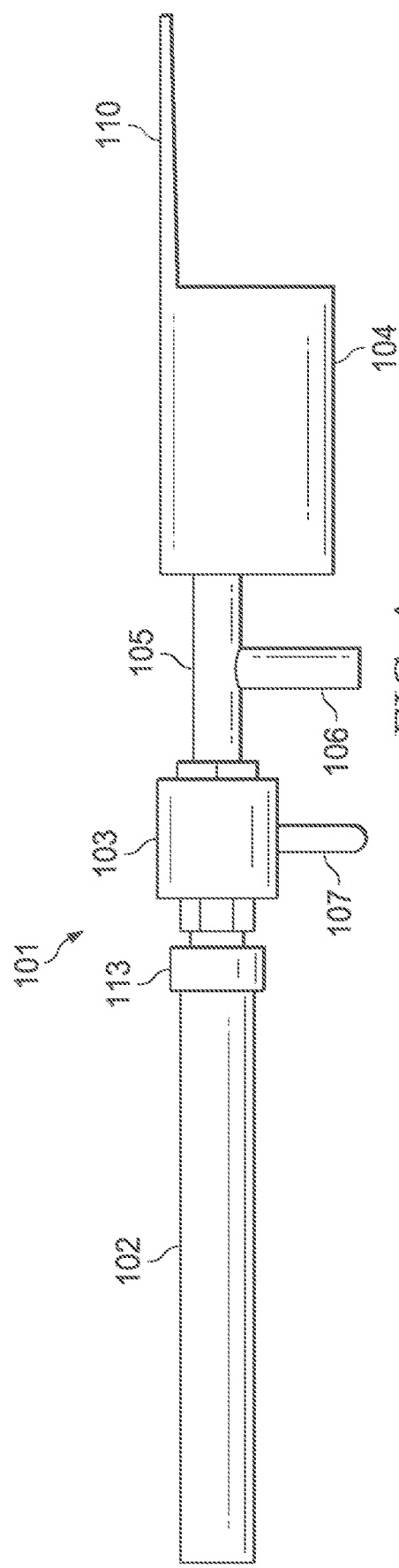
FIG. 4 illustrates a side view of the embodiment of FIG. 3, in accordance with embodiments of the present disclosure.
Figure 5:
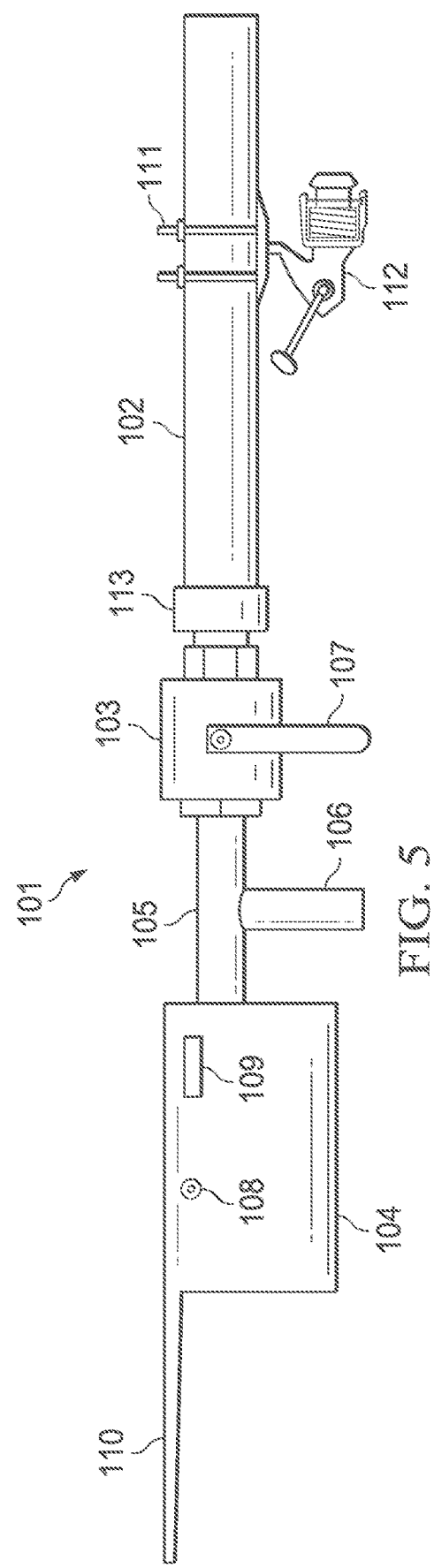
FIG. 5 illustrates another side view of the embodiment of FIG. 3, in accordance with embodiments of the present disclosure.

Turning now to FIGS. 3-5, a second embodiment is shown at apparatus 101.

In some embodiments, devices according to the second embodiment may be hand-held (e.g., actuated while braced against a shoulder of a user). Such devices may be used, for example, by an arborist to launch a rope or a string over a tree limb for purposes of trimming or felling a tree.

The present disclosure concerns a method of accurately launching an object and attachment (e.g., a line, rope, etc.) over an extended, and generally vertical distance using compressed air or gas. Embodiments may be particularly stable, and safe when used to launch an object and attachment to reach a distance of 0-100 feet, such as up and over trees, tree branches, or at a target, and may overcome efficacy, accuracy, and safety issues of using other methods of reaching vertical distances of 0-100 feet in the arborist industry. The present disclosure also may have uses that cross over into the utilities, maintenance, construction, government, and commercial industries.

The second embodiment shown at FIGS. 3-5 may differ from the first embodiment of FIGS. 1-2 in that it is primarily useful for distances of 70-100 feet, while the first embodiment is typically used for longer distances (e.g., 300 yards). Further, the embodiments may be composed of different parts, and different sizes in similar parts, or parts with a similar function. Further, the bracket (e.g., plates 8 and 9), as well as the use of a means of support have been eliminated in the second embodiment. The present disclosure increases efficacy, accuracy, and safety issues of other line-throwing devices by creating a device that will not wear down over time, and has an enclosure for the object in an open ended hollow barrel that prevents the trajectory of the object from being adversely affected by human error.

Relative to the first embodiment of FIGS. 1-2, the second embodiment of FIGS. 3-5 may resemble a gun, or a bazooka; whereas, the first embodiment may more closely resemble a cannon. Intricacies in the manufacturing of the second embodiment are quite different, as well as different component parts being used.

The second embodiment may increase the stability of a shorter vertical shot, transportability, the shoulder support means for the second embodiment, and the condensed component parts facilitating the portability of the second embodiment.

One additional difference is the possible trajectory facilitated by the removal of the bracket, and means of support. The second embodiment allows the personnel operating the device to alter the projectile trajectory by positioning themselves in lieu of using the settings on the bracket in the first embodiment. The modifications also make the manufacturing of the second embodiment more efficient, and cuts down on labor cost, as well as expanding the uses by improving upon the portability of the device, cost, and projectile trajectory capabilities.

The second embodiment may overcome certain deficiencies in the art by stabilizing the propelling of a weighted or unweighted object and attachment with compressed air or gas in the form of a handheld device. By combining the component parts, the stability, accuracy, and efficacy of the line-throwing process is increased, safety concerns of line-throwing are diminished, and the portability, cost, and reduction in parts to the device contribute to an improvement over prior art.

The second embodiment may safely obtain the distance required to perform maintenance in the arborist industry, which is an average of 30-100 feet. The second embodiment may include a device that is made of durable materials that does not limit the portability, projectile trajectory capabilities, or cost as compared to competitors. The other methods used by line-throwing devices, such as springs, elastic bands, and explosives result in a decay over time, instability in the activation of the device, and increased likelihood of accidental ejection.

The second embodiment includes a particular machinery makeup that increases stability in the ejection process compared to the use of other methods; however, it may be especially effective in the arborist industry to reach up and over tree branches. The lightweight, handheld device is created to optimally target distances of 0-100 feet using a stainless steel device that is durable, does not rust, corrode, or wear down over time as compared to the competitors.

A line-throwing device according to the second embodiment may include: a cylindrical compressed gas or air pressured container, an equal, and open ended hollow pipe attached to the air or gas pressured container, a valve, an open ended hollow barrel, a mechanism to release the air or gas pressurized in the cylindrical air or gas pressured container, a weighted or unweighted object, and an attachment to the weighted or unweighted object.

In certain instances, the compressed air or gas is within a cylindrical container from 0 to 140 psi. The pressure may directly affect the distance travelled by the weighted, or unweighted object at a rate of approximately 10 feet=10 psi, up to 140 psi.

There is also disclosed a method for assembling the line-throwing device referred to herein as the Shoulder Shot Tree Toppler. The method includes sophisticated TIG welding of a cylindrical compressed air or gas container. An equal, and open ended hollow pipe is then coupled to the container, a valve is attached to the open ended hollow pipe, which connects the open ended hollow pipe to the open ended hollow barrel, which holds the weighted or unweighted object. The device may be equipped with a mechanism to release the air or gas pressurized in the cylindrical compressed air or gas container, and in one non-limiting aspect the mechanism is a trigger. The weighted or unweighted object and attachment is inserted into the open ended hollow barrel, and the compressed air or gas is released to eject from the open ended hollow barrel the object and attachment to reach a vertical distance with the object, and retain control over the object via the attachment.

Turning now to FIG. 3 of the drawings, the Shoulder Shot Tree Toppler 101 is made up of an open ended hollow barrel 102, a valve 103 that releases the compressed air or gas in the container 104, a cylindrical container that holds compressed air or gas 104, a hollow pipe 105, a hand support 106 affixed to the hollow pipe 105, a mechanism 107 to release the pressure from the cylindrical container 104, a nipple 108 to pressurize the cylindrical container 104, a gauge 109 to determine the pressure in the cylindrical container 104, a shoulder support 110 for the Shoulder Shot Tree Toppler 101, and a coupling 113 connecting the open ended barrel 102 and the valve 103.

In some embodiments, a safety (not shown explicitly) may be used to prevent actuation of mechanism 107. For example, the safety may include a rotatable element 107A that, in one position, permits actuation of mechanism 107, while in another position, prevents actuation of mechanism 107. Thus the device may be rendered inert until such a safety has been disengaged.

In FIG. 4 of the drawings, the Shoulder Shot Tree Toppler 101 is made up of an open ended hollow barrel 102, a valve 103 that releases the compressed air or gas in the container 104, a cylindrical container 104 that holds compressed air or gas, a hollow pipe 105, a hand support 106 affixed to the hollow pipe 105, a mechanism 107 to release the pressure from the cylindrical container 104, a shoulder support 110 for the Shoulder Shot Tree Toppler 101, and a coupling 113 connecting the open ended barrel 102 and the valve 103.

In FIG. 5 of the drawings, the Shoulder Shot Tree Toppler 101 is made up of an open ended hollow barrel 102, a valve 103 that releases the compressed air or gas in the container 104, a cylindrical container 104 that holds compressed air or gas, a hollow pipe 105, a hand support 106 affixed to the hollow pipe 105, a mechanism 107 to release the pressure from the cylindrical container 104, a nipple 108 to pressurize the cylindrical container 104, a gauge 109 to determine the pressure in the cylindrical container 104, a shoulder support 110 for the Shoulder Shot Tree Toppler 101, a mechanism 111 to connect, and attach the retrieval system 112 to the open ended hollow barrel 102, a mechanism for line retrieval 112, and a coupling 113 connecting the open ended barrel 102, and the valve 103.

The open ended hollow barrel 102 may be connected to the valve 103, and the valve 103 may be connected to the cylindrical container 104 that holds the compressed air or gas by a hollow pipe 105. A handheld support 106 stabilizes the Shoulder Shot Tree Toppler 101, and a mechanism 107 to release the pressure from the cylindrical container 104 through the hollow pipe 105 and valve 103 exiting the hollow barrel 102. A handheld means of support 106 is affixed to the hollow pipe 105 to stabilize the device and aim it at a desired target. A shoulder means of support 110 is affixed to the cylindrical container 104.

To activate the device 101, the cylindrical container 104 is pressurized to appropriate pressure by referencing the gauge 109, by injecting compressed air or gas via the nipple 108. Mechanism 107 may then be used to release the pressure in the cylindrical container 104, depicted in FIG. 5 as a handle in one non-limiting aspect.

Once the device 101 is activated, the mount for the retrieval system 111 that is connected to the open ended hollow barrel 102, and the retrieval system 112, depicted in FIG. 5 as a fishing reel in one non-limiting aspect, may be engaged to quickly and effectively retrieve the line that the device has thrown at, or over a desired target.

Thus according to FIGS. 3-5, embodiments may include a line-throwing device, and methods for its use, titled the Shoulder Shot Tree Toppler. The line-throwing device may be a device used to reach a generally vertical distances with a weighted or unweighted object, and an attachment, such as a line or rope, up and over or at a target to facilitate maintenance, or other activities by personnel in various industries such as the utilities arborist, construction, government, or commercial industry. The line-throwing device, the Shoulder Shot Tree Toppler, is particularly stable, and safe, and overcome efficacy, accuracy, cost, portability, and safety issues associated with the propelling of an object a selected distance.

The following is a numbered list of certain embodiments that may be used according to the second embodiment of FIGS. 3-5. Although written in the style of claims, this is merely a list of example embodiments contemplated herein.

1. A line-throwing device comprising:
   a compressed gas or air container;
   a valve, releasing air from the container;
   an equal, and open ended hollow pipe attached to the container, and valve;
   an open ended hollow barrel connected to the valve;
   a mechanism to release the air or gas pressurized in the container, such as a handle; and
   a nipple affixed to the container, and an incision into the container that facilitates the air or gas communication with the container, and fills said container when the sensed pressure is below the desired threshold.

2. The line-throwing device of embodiment 1, wherein the gas or air container is cylindrical in shape.

3. The line-throwing device of embodiment 1, wherein the line-throwing device is made of stainless steel.

4. The line-throwing device of embodiment 1, wherein the hollow pipe attached to the container, and valve is straight.

5. The line-throwing device of embodiment 1, wherein the open-ended hollow barrel is PVC pipe.

6. The line-throwing device of embodiment 1, wherein the mechanism to release the air or gas pressurized in the container is a trigger.

7. The line-throwing device of embodiment 1, wherein an additional means of support, a shoulder strap, is attached to the line-throwing device.

8. The line-throwing device in embodiment 1, wherein a line retrieval system is attached to the open-ended barrel, in one non-limiting aspect the retrieval system is a reel attachment, and fishing line.

9. The line-throwing device in embodiment 1, wherein the device is used to propel a weighted object is in one non-limiting aspect a metallic projectile, that is attached to the line retrieval system.

10. The line-throwing device in embodiment 1, wherein the device is configured to propel an unweighted object that is a metallic projectile, that is attached to the line retrieval system.

11. The line-throwing device in embodiment 1, wherein the device is configured to propel a weighted or unweighted object comprised of plastic.

12. The line-throwing device in embodiment 1, wherein the device is configured to propel a weighted or unweighted object that is encased in foam to insulate the impact of the object upon the activation of the line-throwing device.

13. The line-throwing device in embodiment 1, wherein the device is configured to propel a weighted object that is in one non-limiting aspect a bag, such as a bean-bag, to insulate the impact of the object upon the activation of the line-throwing device, and protect the arborists or personnel operating the device, as well as the target, and nearby surroundings.

14. The line-throwing device in embodiment 1, wherein the mechanism to release the air pressurized in the air or gas container is a trigger.

15. The line-throwing device in embodiment 1, wherein the valve is connected on one end to an open ended hollow pipe connected to a container pressurized with air or gas, and connected on the other end to a coupling attaching the open ended hollow barrel.

16. A line-throwing device comprising:
a compressed gas or air container;
a valve, releasing air from the container;
an equal, and open ended hollow pipe attached to the container, and valve;
an open ended hollow barrel adapted for receiving and shooting an object, connected to the valve;
a mechanism to release the air or gas pressurized in the container, such as a handle affixed to the unit;
a nipple affixed to the container, and an incision into the container that facilitates the air or gas communication with the container, and fills said container when the sensed pressure is below the desired threshold; and
a line retrieval system that efficiently recoils the line that is thrown by the device.

17. The line-throwing device in embodiment 16, wherein the line retrieval system is attached to the open ended hollow barrel.

18. The line-throwing device in embodiment 16, wherein the line retrieval system, in one non-limiting aspect, is a fishing reel.

19. The line-throwing device in embodiment 16, wherein the line retrieval system, in one non-limiting aspect, is a line or rope.

20. A line-throwing device comprising:
a compressed gas or air container;
a valve, releasing air from the container;
an equal, and open ended hollow pipe attached to the container, and valve;
an open ended hollow barrel adapted for receiving and shooting an object, connected to the valve;
a mechanism to release the air or gas pressurized in the container, such as a handle affixed to the unit;
a nipple affixed to the container, and an incision into the container that facilitates the air or gas communication with the container, and fills said container when the sensed pressure is below the desired threshold.
a line retrieval system that efficiently recoils the line that is thrown by the device; and
a shoulder support to stabilize the line-throwing device upon activation of the device.

21. The line-throwing device in embodiment 20, wherein the means of shoulder support is attached to the back end of the container 22. The line-throwing device in embodiment 20, wherein the means of shoulder support is a strap attached to the line-throwing device 23. The line-throwing device in embodiment 20, wherein the means of shoulder support is the back end of the container 24. A line-throwing device comprising:
a compressed gas or air container attached to a valve;
a valve, releasing air from the container;
an open ended hollow barrel adapted for receiving and shooting an object; and
a mechanism to release the air or gas pressurized in the container, such as a handle affixed to the unit.

25. A line-throwing device comprising:
a compressed gas or air container; attached to a valve;
a valve, releasing air from the container;
an open ended hollow barrel adapted for receiving and shooting an object;
a mechanism to release the air or gas pressurized in the container, such as a handle affixed to the unit;
a line retrieval system that efficiently recoils the line that is thrown by the device;
a shoulder support to stabilize the line-throwing device upon activation of the device; and
a weighted or unweighted object connected to the line retrieval system that the device propels at a particular target.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

In some embodiments, the elements shown in the various FIGURES may not be drawn to scale. In other embodiments, however, the FIGURES may be drawn to scale.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus comprising:
a pressure vessel configured to contain a compressed gas, wherein the pressure vessel comprises a longitudinal axis, a back end surface that is substantially perpendicular to the longitudinal axis, and a cylindrical sidewall that is parallel to the longitudinal axis;
a barrel having an open end;
a valve configured to release the compressed gas from the pressure vessel into the barrel to launch a projectile from the open end of the barrel; and
a shoulder support attached to the back end surface of the pressure vessel, the shoulder support configured to allow a user of the apparatus to actuate the valve while the apparatus is mounted on top of a shoulder of the user, wherein the shoulder support is parallel to the longitudinal axis of the pressure vessel and perpendicular to the back end surface of the pressure vessel such that, when the apparatus is mounted on top of the user's shoulder, the user's shoulder is in contact with both the shoulder support and the back end surface of the pressure vessel.

2. The apparatus of claim 1, wherein the pressure vessel is cylindrical in shape.

3. The apparatus of claim 1, wherein the apparatus is made of stainless steel.

4. The apparatus of claim 1, wherein the pressure vessel, the barrel, and the valve are all aligned along a common longitudinal axis.

5. The apparatus of claim 1, wherein the barrel is a PVC pipe.

6. The apparatus of claim 1, further comprising a trigger configured to actuate the valve.

7. The apparatus of claim 1, further comprising a shoulder strap.

8. The apparatus of claim 1, further comprising a line retrieval system.

9. The apparatus of claim 8, wherein the line retrieval system comprises a reel mounted on the barrel near the open end and a fishing line wound on the reel.

10. The apparatus of claim 6, further comprising a safety mechanism comprising a rotatable element that, in a first position, permits the valve to be actuated and, in a second position, prevents the valve from being actuated.

11. A method comprising:
coupling a barrel having an open end to a pressure vessel configured to contain a compressed gas, wherein the pressure vessel comprises a longitudinal axis, a back end surface that is substantially perpendicular to the longitudinal axis, and a cylindrical sidewall that is parallel to the longitudinal axis;
coupling a valve to the pressure vessel, the valve being configured to release the compressed gas from the pressure vessel into the barrel to launch a projectile from the open end of the barrel; and
coupling a shoulder support to the back end surface of the pressure vessel, the shoulder support being configured to allow a user of the apparatus to actuate the valve while the apparatus is mounted on top of a shoulder of the user,
wherein the shoulder support is parallel to the longitudinal axis of the pressure vessel and perpendicular to the back end surface of the pressure vessel such that, when the apparatus is mounted on top of the user's shoulder, the user's shoulder is in contact with both the shoulder support and the back end surface of the pressure vessel.

12. The method of claim 11, further comprising:
coupling a trigger to the valve that permits the user to actuate the valve; and
coupling, to the trigger, a safety mechanism comprising a rotatable element that, in a first position, permits the valve to be actuated and, in a second position, prevents the valve from being actuated.

13. The method of claim 11, further comprising:
incorporating a nipple to the pressure vessel, to permit compressed gas to be inserted into the pressure vessel; and
incorporating a pressure gauge to the pressure vessel, to permit a detection of an amount of pressure currently in the pressure vessel.

14. A line-throwing system, comprising: an attachment ejecting apparatus;
an object to be launched from the attachment ejecting apparatus; and
a retrieval line attachable to the object to be launched, for retrieving the object after it has been launched using the attachment ejecting apparatus,
wherein the attachment ejecting apparatus comprises:
a pressure vessel configured to contain a compressed gas, wherein the pressure vessel comprises a longitudinal axis, a back end surface that is substantially perpendicular to the longitudinal axis, and a cylindrical sidewall that is parallel to the longitudinal axis;
a barrel having an open end;
a valve configured to release the compressed gas from the pressure vessel into the barrel to launch a projectile from the open end of the barrel; and
a shoulder support attached to a back end of the pressure vessel, the shoulder support configured to allow a user of the apparatus to actuate the valve while the apparatus is mounted on top of a shoulder of the user,
wherein the shoulder support is parallel to the longitudinal axis of the pressure vessel and perpendicular to the back end surface of the pressure vessel such that, when the apparatus is mounted on top of the user's shoulder, the user's shoulder is in contact with both the shoulder support and the back end surface of the pressure vessel.

15. The line-throwing system of claim 14, wherein the attachment ejecting apparatus further comprises:
a trigger that permits the user to actuate the valve; and
a rotatable safety element configured such that, in a first position, the valve can be actuated, and, in a second position, the valve cannot be actuated.

16. The line-throwing system of claim 14, wherein the attachment ejecting apparatus further comprises a line retrieval system attached near the open end of the barrel.

17. The line-throwing system of claim 14, wherein the object to be launched comprises a bean bag.

18. The line-throwing system of claim 14, wherein the object to be launched is encased in a foam, to insulate an impact when the projectile is launched.

19. The line-throwing system of claim 14, wherein the object to be launched is comprised of a plastic.

20. The line-throwing system of claim 14, wherein the shoulder support comprises an extension of pressure vessel.

* * * * *